United States Patent [19]
Glass

[11] 3,732,929
[45] May 15, 1973

[54] MOLDED HORSE BOOT
[75] Inventor: Neel W. Glass, Los Alamos, N. Mex.
[73] Assignee: Les-Kare, Inc., Los Alamos, N. Mex.
[22] Filed: Dec. 29, 1971
[21] Appl. No.: 213,392

Related U.S. Application Data
[63] Continuation-in-part of Ser. No. 93,119, Nov. 27, 1970, Pat. No. 3,703,209.

[52] U.S. Cl..............................168/18, 54/82
[51] Int. Cl.....................A01l 03/00, B68c 05/00
[58] Field of Search.....................168/18, 1, 2, 3; 54/82

[56] References Cited
UNITED STATES PATENTS
1,039,002   9/1912   Winston .......................168/1 X
840,892     1/1907   Adam ..........................168/1
122,972     1/1872   Sloat ..........................168/18

*Primary Examiner*—Hugh R. Chamblee
*Attorney*—Henry Heyman

[57] ABSTRACT

A horse boot of molded composition having a sole and walls which substantially conform to the shape of a horse's foot and having reentrant folds in the walls substantially where the side walls meet the front wall to enable the boot to be enlarged at the top to permit slipping the same on a horse's foot, tensioning means for snugging the walls of the boot around the horse's foot and a substantially horizontally disposed strap disposed adjacent the interior side and rear walls of the boot and adjustably attached to the tensioning means at locations on the side walls which are proximate the reentrant folds.

5 Claims, 3 Drawing Figures

PATENTED MAY 15 1973

3,732,929

INVENTOR
Neel W. Glass

By Henry Heyman
attorney

MOLDED HORSE BOOT

This application is a continuation-in-part of application Ser. No. 93,119 filed Nov. 27, 1970 by Neel W. Glass, now U.S. Pat. No. 3,703,209.

The referenced parent application discloses a molded horse boot of plastic composition such as a urethane. The boot comprises a rugged relatively stiff sole portion and integral uprising walls of shape conforming to a horse's foot.

The side walls near the front wall are provided with integral reentrant folds to permit the boot to be spread open to slip over the broader sole portion of the foot. A tensioning device bracket is fastened to the side walls slightly behind each reentrant fold and the associated tensioning device is tightened by an over-center toggle device or buckle situate on the front wall of the boot. Plastic boots so made are securely fastened to the horse's foot by diffuse pressure around the hoof and cartilage at the rear of the foot but are limited in adjustability because of the stiffness of the plastic material and therefore must be made in many sizes to be compatible with the variations in sizes of horses' feet. In addition, the forces which tend to loosen or remove the boots under different conditions of horses' gait are complex and not fully understood.

The present invention is directed to a modification of the plastic horse boot, which modification resides in the provision of a strong internal strap which goes around the rear portion of the boot in the interior thereof and which is secured by detachable fasteners to the boot side walls and the tensioning device brackets in a manner which allows for selection of the correct strap length and in effect the correct length of the loop comprising tensioning device and strap. In this manner the boot can be slipped on a horse's foot and empirically adjusted for a proper, secure, and comfortable fit. Additionally, the strap is provided with ridges preferably in the shape of downwardly directed serrations to provide improved adherence to the foot.

Accordingly, it is a primary objection of the present invention to provide a composition horse boot of improved size adjustability to thereby reduce the number of stock sizes needed to fit the naturally occurring range of sizes of horse feet.

It is another objective of the present invention to provide a molded composition horse boot which can be reliably secured on a horse's foot by means which applies constraint to only the front hoof and rear cartilage portions of the horse's foot and which means provide constriction tension continuity with forward adjustable tensioning means.

It is another objective of the present invention to provide in the mechanism for attaching a horse boot on a horse's foot an adjustable in length internal strap having on its surface facing the interior thereof a configuration which constantly maintains secure attachment of the boot on a horse's foot.

The above objectives, together with other objects and advantages which will subsequently become apparent, reside in the details of the construction, arrangement and combination of the several parts and features as are more fully hereinafter described and claimed, reference being made to the accompanying drawings made a part hereof wherein like numerals refer to like parts throughout, and in which:

Figure 1:
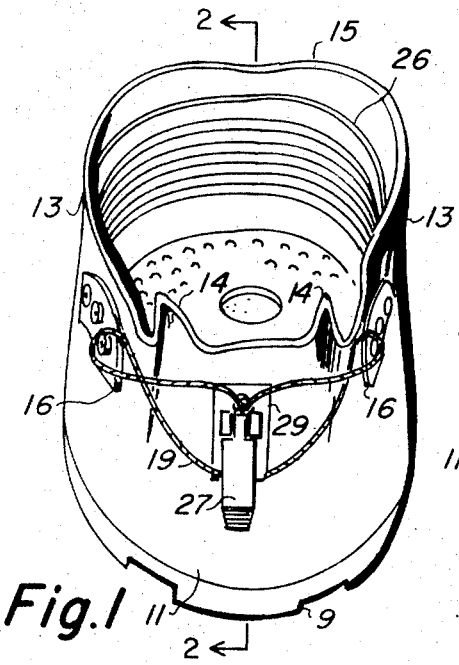
FIG. 1 is a downwardly inclined perspective view of the horse boot of the present invention.
Figure 2:
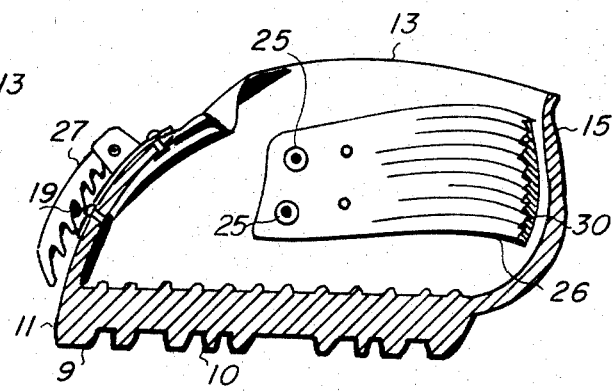
FIG. 2 is a side elevation of the cross section on vertical plane 2—2 of FIG. 1.

Referring to the figures of the drawing, the horse boot comprises a sole portion 9 provided with treads 10, an integral front wall 11, integral side walls 13 and an integral rear wall 15. The horse boot is molded of a thermosetting or thermoplastic strong plastic such as urethane. The plastic, while somewhat pliable, is strong in tension and resists elongation. To the end that the boot can be slipped over the hoof, it is provided with reentrant folds 14 which allows the area enclosed by the walls to be enlarged while the boot is being put on. The peripheral area of the boot is constricted by a tensioning mechanism comprising side plates 16, cable 19, and over-center toggle 27. A plurality of pins with enlarged heads 23 are rigidly affixed to the side plates to allow for length selectivity in anchoring cable 19.

Screws 24 attach the rearward part of the side plates to the boot wall and additionally penetrate the boot wall to cooperatively engage threaded eyes 25 in strap 26.

Because of the limited flexibility of the boot material, the constriction means is effective over a limited length adjusting range. It is necessary that firm engagement be obtained around the horse's foot, particularly between the cartilage heel of the foot and the front hoof portion. To the end that secure engagement will be obtainable over a range of horse foot sizes, the internal strap 26 is provided. The strap lies parallel to the side and rear wall of the boot. It is affixed to the side wall of the boot by threaded ferrules or eyelets 25.

Ferrules 25 are of a well known type having an internally threaded cylindrical part integral with a planar washer part. The cylindrical part is inserted in eyes provided in sets in one or both ends of the strap 26. Screws 24 which affix the side plates to the boot cooperatively engage the ferrules 25. If upon placing the boot on the horse's foot the fit can be improved by a different adjustment of the strap length, the boot is removed, the screws 23 withdrawn from ferrules 25, the ferrules positioned in a different set of holes in the strap and the screws are replaced.

It is an important feature of this invention that the tensile forces when the boot is being worn are continuous around the boot.

Figure 3:
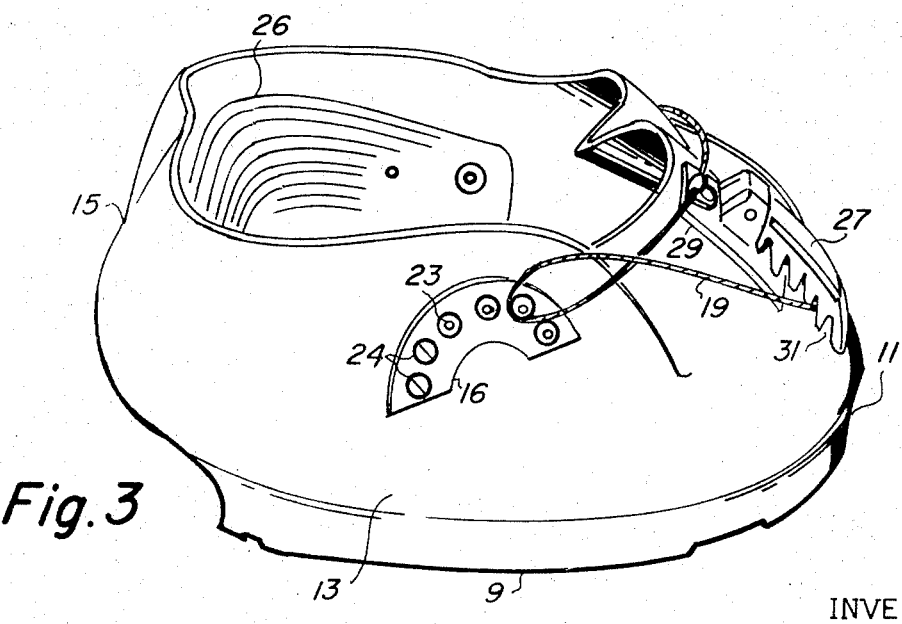
FIG. 3 is an exterior view in elevation of the right side of the horse boot of FIG. 1.

As seen in FIGS. 1 and 3, an over-center toggle buckle 27 is pivotally supported on hinge bracket 29. The toggle is provided with a plurality of transverse slots 31 for the purpose of receiving and tensioning cable 19. When toggle buckle 27 is in the released position, that is, pointed upward or somewhat backward, the distance from the slots to the bracket pins 23 is considerably less than when the toggle buckle is in the down or locked position. The internal strap 26 is also fastened to brackets 16 with the result that tensioning of cable 19 imparts a constriction which is continuous around strap 26, brackets 16 and cable 19. The pressure of the upper of the front part of the boot against the upper front surface of the hoof is the main anchoring effect of the constriction mechanism. The strap 26 provides the means for maintaining the hoof forward particularly when the hose thrusts the foot backward in the forward phase of propulsion sequence. The rearward thrust may be a considerable force and unless the boot can solidly resist sliding between the boot and the foot, the anchoring effect between the front surface of the hoof and the front wall of the boot would be adversely affected and on relaxation of the thrust the rear binding relationship between boot and foot would be adversely affected. It has been found that a properly fitted boot will shift within limits which are so small that the shifting will not affect loss of the boot even under strenuous conditions. The anchoring is enhanced if the interior surface of the strap is provided with horizontally extending downwardly serrated ridges 30. Any downward movement of the strap on the cartilage of the foot under the conditions above-mentioned is removed when the horse takes the next step. The result is that the boots are reliably retained in place under all conditions of use.

What I claim is:

1. A composition molded boot for horses comprising a sole and integral walls conforming in shape to a horse's foot, a reentrant fold on each side of the front hoof wall and having the fold creases lying in the plane substantially that of the front of the hoof, a pair of brackets symmetrically located and affixed to the boot side wall upper portions rearward of and proximate the reentrant folds, a binding cable means engaging the side brackets and passing over the front of the boot, buckle means engaging said cable for allowing the reentrant folds to be spread apart when in released position and to compress and contract the reentrant folded when in engaged position, wherein the improvement comprises an elongated strap supported proximate the interior surface of the side walls of the boot to cooperate with the binding cable, bracket means and buckle means in effecting a substantially continuous constricting loop around the front and sides of the hose's foot and the cartilage extensions of the horse's foot at the rear thereof.

2. The horse boot improvement of claim 1 in which the side brackets are affixed to the boot side walls with boot wall penetrating removable fasteners, at least one end of the strap having a plurality of spaced apertures, and means for engaging the removable fasteners also engaging selected ones of the spaced apertures in the strap to secure the bracket, boot side wall and strap together to effect desired engagement between the boot and the horse's foot when the buckle means is in engaged position.

3. The horse boot improvement of claim 2 in which the surface of the strap facing the interior of the boot is provided with horizontally extending ridges.

4. The horse boot improvement of claim 3 in which the ridges are downwardly directed serrations.

5. The horse boot improvement of claim 4 in which the buckle means is an over-center toggle.

* * * * *